US008724155B2

(12) United States Patent　　(10) Patent No.: US 8,724,155 B2
Sanchez　　(45) Date of Patent: May 13, 2014

(54) COPIER REPRINTING SYSTEMS AND METHODS

(75) Inventor: Hector J. Sanchez, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 3251 days.

(21) Appl. No.: 11/111,653

(22) Filed: Apr. 21, 2005

(65) Prior Publication Data

US 2006/0238808 A1　Oct. 26, 2006

(51) Int. Cl.
　　*G06K 15/00*　　(2006.01)
(52) U.S. Cl.
　　USPC .......................................................... 358/1.16
(58) Field of Classification Search
　　USPC ........................................ 358/400, 1.16, 448
　　See application file for complete search history.

(56) References Cited

U.S. PATENT DOCUMENTS

| | | |
|---|---|---|
| 6,116,826 A | 9/2000 | Benway |
| 6,246,993 B1 | 6/2001 | Dreyer et al. |
| 7,209,984 B2 * | 4/2007 | Orito .............................. 710/52 |
| 2002/0041386 A1 | 4/2002 | Suzuki et al. |
| 2002/0171868 A1 * | 11/2002 | Yoshimura et al. .......... 358/1.15 |
| 2004/0090647 A1 | 5/2004 | Beard et al. |
| 2005/0019077 A1 | 1/2005 | Hatta et al. |
| 2005/0024671 A1 * | 2/2005 | Abe ............................. 358/1.13 |
| 2005/0111038 A1 * | 5/2005 | Sakamoto .................... 358/1.16 |

* cited by examiner

*Primary Examiner* — Benny Q Tieu
*Assistant Examiner* — Sunil Chacko
(74) *Attorney, Agent, or Firm* — Gibb & Riley, LLC

(57) ABSTRACT

A copier apparatus includes a scanner for acquiring at least one image to be copied. Temporary storage is adapted to temporarily store the image only until the next subsequent print/copy job is scanned. At least one printing engine is used to print the image on a medium. In addition, a processor is preset to delete the image from the temporary storage after completion of printing of the image by the printing engine unless the user interface has previously received an instruction to reprint the image. If the user provides an instruction to reprint the image, the user interface is adapted to display a menu of reprint options. Then the image can be reprinted without having to be rescanned.

20 Claims, 3 Drawing Sheets

COPIER REPRINTING SYSTEMS AND METHODS

BACKGROUND

In conventional copiers, an image of an original set is read by a scanning device such as a CCD (Charge Coupled Device), and a latent image is recorded on a photosensitive drum by using a semiconductor laser. By using an electrophotographic process, the latent image on the photosensitive drum is developed, and is transferred onto a sheet, and an image is thereby output. The copier is provided with, as a user interface, a compact display panel such as a touch panel superposed on a display panel formed from a liquid crystal display board.

Network printing is performed by connecting a plurality of printers to a network such that images can be output from the respective printers. The network can include a scanner for reading an original, and a printer server which appropriately processes image data received from the scanner and transmits the processed image data to a designated printer. Usually, one scanner is connected to the network, and the scanner has functions which are similar to the image reading functions of the copier. In order to carry out output efficiently, display panels which serve as user interfaces are provided at the copier, print server, and scanner.

As described in, for example, in the US patent publication 2002/0041386, which is incorporated herein by reference, a previously scanned and saved image can be printed, by pressing a "reprint" button on a menu screen. By pressing this button, a desired image from the images accumulated in the permanent or semi-permanent memory of the scanner, print server, or copier, can be output again through the printing engine.

Issued U.S. Pat. Nos. 6,246,993 and 6,166,826 as well as US patent publication 2005/0019077 (all of which are incorporated herein by reference) disclose different systems for reprinting images. However, each of these systems requires a permanent or semi-permanent memory that can retain the images or print jobs after they have been printed. Such permanent or semi-permanent memories are complicated and add to the cost and sophistication of copiers and printing devices. The embodiments described below provide the ability to reprint images and print jobs without incurring any cost and complication associated with such permanent or semi-permanent memory.

SUMMARY

Embodiments herein comprise a copier apparatus that includes a scanner for acquiring at least one image to be copied. Temporary storage that is operatively connected to the scanner is adapted to temporarily store the image only until the next subsequent print copy job is scanned by the scanner. At least one printing engine is operatively connected to the temporary storage. The printing engine is used to print the image on a medium, such as paper, transparencies, etc. In addition, a processor is connected to the scanner, the temporary storage, and the printing engine. Further, a user interface connects to the processor.

The processor is preset to delete the image from the temporary storage after completion of printing of the image by the printing engine. This deletion always occurs immediately after (or simultaneously with) the ending of the printing process (or at least before the next print job is scanned in) unless the user interface has previously received an instruction to reprint the image. If the user provides an instruction to reprint the image, the user interface is adapted to display a menu of reprint options. Then the image can be reprinted without having to be rescanned.

In a more specific example, one embodiment is stand-alone digital copier that has an integrated scanner and user interface, where the temporary storage, printing engine, and processor are all internally within the copier. Thus, this embodiment does not need to be connected to a print server, personal computer, etc., but instead operates independently through direct user input to the user interface, needing simply printing supplies and a power source. To save costs, decrease complexity, and increase yield, this embodiment is devoid of permanent storage capable of storing previously printed images. By simplifying the image storage aspect of the copier, the cost and complexity of the copier is decreased.

Because the processor is preset to delete the image from the temporary storage upon completion of printing of the image by the printing engine, the instruction to reprint the image must be received before the next subsequent print job is scanned in order for the processor to direct reprinting of the image through the printing engine. Otherwise the image would have to be rescanned because the image would be purged from memory just before the next image is scanned.

The user interface can include a reprint button and reprint menu. This menu can include choices for the number of copies, copy color, copy magnification, duplexing options, paper tray options, and/or finisher options, etc.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Embodiments herein provide a feature for an electronic reprographics device where a scanned document that has not yet been purged from system memory after a job has completed can be reprogrammed as a new job without needing to be rescanned. Reprogramming options include printing additional sets, sending an e-mail message, etc. This capability is particularly useful if the job contains a large number of sheets, where rescanning would be time consuming for the user. A user interface (UI) selection that commands the system to reprint the last scanned image is accessible only while the images are still in memory.

Figure 1:
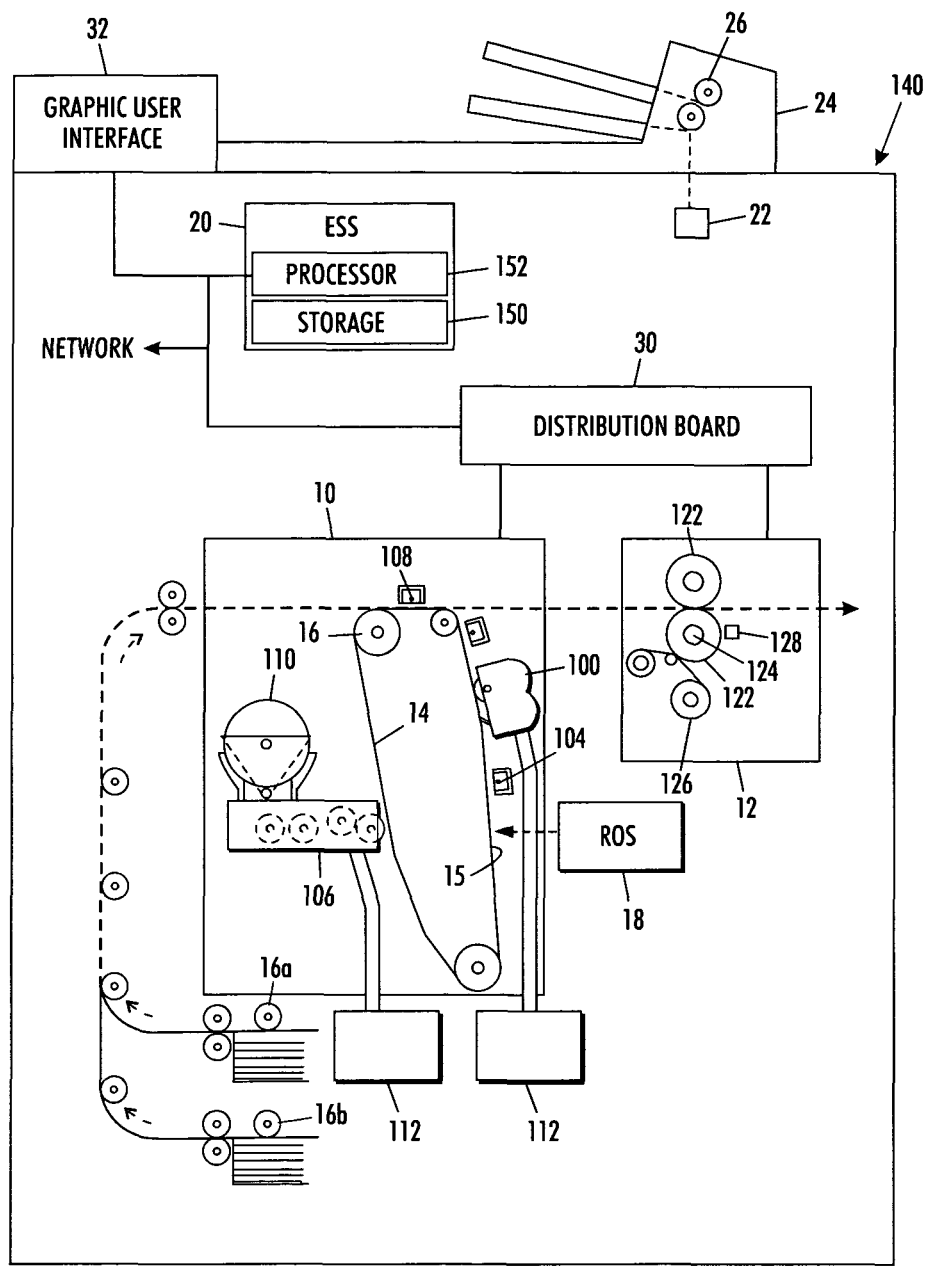
FIG. 1 is a schematic representation of a system embodiment.

Many aspects of printers and copiers are well-known. For example, U.S. Patent Publication 2004/0090647, incorporated herein by reference, discloses a well-known copier/printer. One non-limiting embodiment of a copier/printer apparatus 140 according to embodiments herein is shown in FIG. 1. More specifically, FIG. 1 is a simplified partially-elevational, partially-schematic view of an electrophotographic printing apparatus, in this case a combination digital copier/printer. As used herein, a "printing apparatus" can apply to any machine that outputs prints in whatever manner, such as a light-lens copier, digital printer, facsimile, or multifunction device, and can create images electrostatographically, by ink-jet, hot-melt, or by any other method.

Two portions of hardware in the machine include a "xerographic module" indicated as 10, and a "fuser module" indicated as 12. As is familiar in the art of electrostatographic printing, there is contained within xerographic module 10 many of the hardware elements used to create desired images electrophotographically. The images are created on the surface of a rotating photoreceptor 14 which is mounted on a set of rollers, as shown. Disposed at various points around the circumference of photoreceptor 14 are a cleaning device generally indicated as 100, which empties into a "toner reclaim bottle" 102, a charging corotron 104 or equivalent device, a developer unit 106, and a transfer corotron 108. Of course, in any particular embodiment of an electrophotographic printer, there may be variations on this general outline, such as additional corotrons, or cleaning devices, or, in the case of a color printer, multiple developer units.

With particular reference to developer unit 106, as is familiar in the art, the unit 106 generally comprises a housing in which a supply of developer (which typically contain toner particles plus carrier particles) which can be supplied to an electrostatic latent image created on the surface of photoreceptor 14 or other charge receptor. Developer unit 106 may be made integral with or separable from xerographic module 10; and in a color-capable embodiment of the embodiments herein, there would be provided multiple developer units 106, each unit developing the photoreceptor 14 with a different primary-color toner.

A toner bottle 110, which could contain either pure toner or an admixture of carrier particles, continuously or selectably adds toner or developer into the main body of developer unit 106. In one particular embodiment of an electrophotographic printer, there is further supplied a developer receptacle here indicated as 112, which accepts excess developer directly from the housing of development unit 106.

Turning to fuser module 12, there is included in the present embodiment all of the elements of a subsystem for fusing a toner image which has been electrostatically transferred to a sheet by the xerographic module 10. As such, the fuser module 12 includes a pressure roll 120, a heat roll 122 including, at the core thereof, a heat element 124, and a web supply 126, which provides a release agent to the outer surface of heat roll 122 so that paper passing between heat roll 122 and pressure roll 120 does not stick to the heat roll 122. For purposes herein, either a heat roll or a pressure roll can be considered a "fuser roll." Also typically included in a fusing subsystem is a thermistor such as 128 for monitoring the temperature of a relevant portion of the subsystem.

Paper or other medium on which images are desired to be printed are retained on one or more paper stacks. Paper is drawn from the stacks, typically one sheet at a time, by feed rolls such as indicated as 16a and 16b. When it is desired to print an image on a sheet, a motor (not shown) activates one of the feed rolls 16a, 16b, depending on what type of sheet is desired, and the drawn sheet is taken from the stack and moved through a paper path, shown by the dot-dash line in the Figure, where it eventually comes into contact with the photoreceptor 14 within xerographic module 10. At the transfer corotron 108, the sheet receives an unfused image, as is known in the art. The sheet then passes further along the paper path through a nip formed between pressure roll 120 and heat roll 124. The fuser subsystem thus causes the toner image to be permanently fixed to the sheet, as is known in the art.

In a digital printing apparatus, whether in the form of a digital printer or in a digital copier, images are created by selectably discharging pixel-sized areas on the surface of photoreceptor 14, immediately after the surface is generally charged such as by corotron 104. Typically, this selective discharging is performed by a raster output scanner (ROS) indicated as 18, which, as is known, includes a modulating laser which reflects a beam off a rotating reflective polygon. Other apparatus for image wise discharging of the photoreceptor 14, such as an LED bar or ionographic head, are also known. The image data operative of the ROS 18 or other apparatus typically generated by what is here called an "electronic subsystem" or ESS, here indicated as 20. (For clarity, the necessary connection between ESS 20 and ROS 18 is not shown.)

The ESS 20 can receive original image data either from a personal computer, or one of several personal computers or other apparatus on a network, or, in the case where the apparatus is being used as a digital copier, via a scanner comprising a photosensor bar here indicated as 22. Briefly, the photosensor bar 22 typically includes a linear array of pixel-sized photosensors, on which sequences of small areas on an original hard-copy image are focused. The photosensors in the array convert the dark and light reflected areas of the original image into electrical signals, which can be compiled and retained by ESS 20, ultimately for reproduction through ROS 18.

If the apparatus is being used in digital copier mode, it is typically desired to supply an original document handler, here generally indicated as 24, to present either or both sides of a sequence of hard-copy original pages to the photosensor bar 22. As is familiarly known, a document handler such as 24 may include any number of rollers, nudgers, etc. one of which is here indicated as 26.

There is further provided within the electrophotographic printing/copying apparatus, what is here called a "distribution board" 30. The distribution board 30 can send or receive messages, as will be described below, through the same network channels as ESS 20, or alternately through a telephone or facsimile line (not shown); alternately, the distribution board 30 can cause messages to be displayed through a graphic user interface 32 that has a display, typically in the form of a touch screen disposed on the exterior of the apparatus.

Thus, embodiments herein comprise a copier apparatus 140, such as that shown in FIG. 1, which includes a scanner 22 for acquiring at least one image to be copied. Temporary storage 150 within the ESS 20 that is operatively connected to the scanner 22 is adapted to temporarily store the image only while the image is being printed. At least one printing engine 10, 12 is operatively connected to the temporary storage 150 through the processor 152, distribution board 30, etc. The printing engine 10, 12 is used to print the image on a medium, such as paper, transparencies, etc. In addition, a processor 152 within the ESS 20 is connected to the scanner 22, the temporary storage 150, and the printing engine 10, 12. Further, a user interface 32 connects to the processor 152.

The processor 152 is preset to delete the image from the temporary storage 150 after completion of printing of the image by the printing engine 10, 12 because the memory 150 is too small to accommodate many print jobs. More specifically, the storage/memory 150 (which can comprise magnetic storage, electronic storage, etc.) is only large enough to perform pre-collation functions. In other words, the memory 150 is large enough to store at least the number of sheets of the maximum capacity of the document handler 24 and sort these pages; however, the memory is purged or erased before the next subsequent print job is scanned by the scanner 22 because the memory cannot store multiple maximum document handler-sized print jobs. This deletion will occur immediately after (or simultaneously with) the ending of the printing process (or before the next print job is scanned in, at the latest) unless the user interface 32 has previously received an instruction to reprint the image. Thus, the latest, the memory 150 must be erased before the next print job is scanned and started. Therefore, the reprint option of embodiments herein is only available until the next print job is scanned by the scanner 22.

Figure 2:
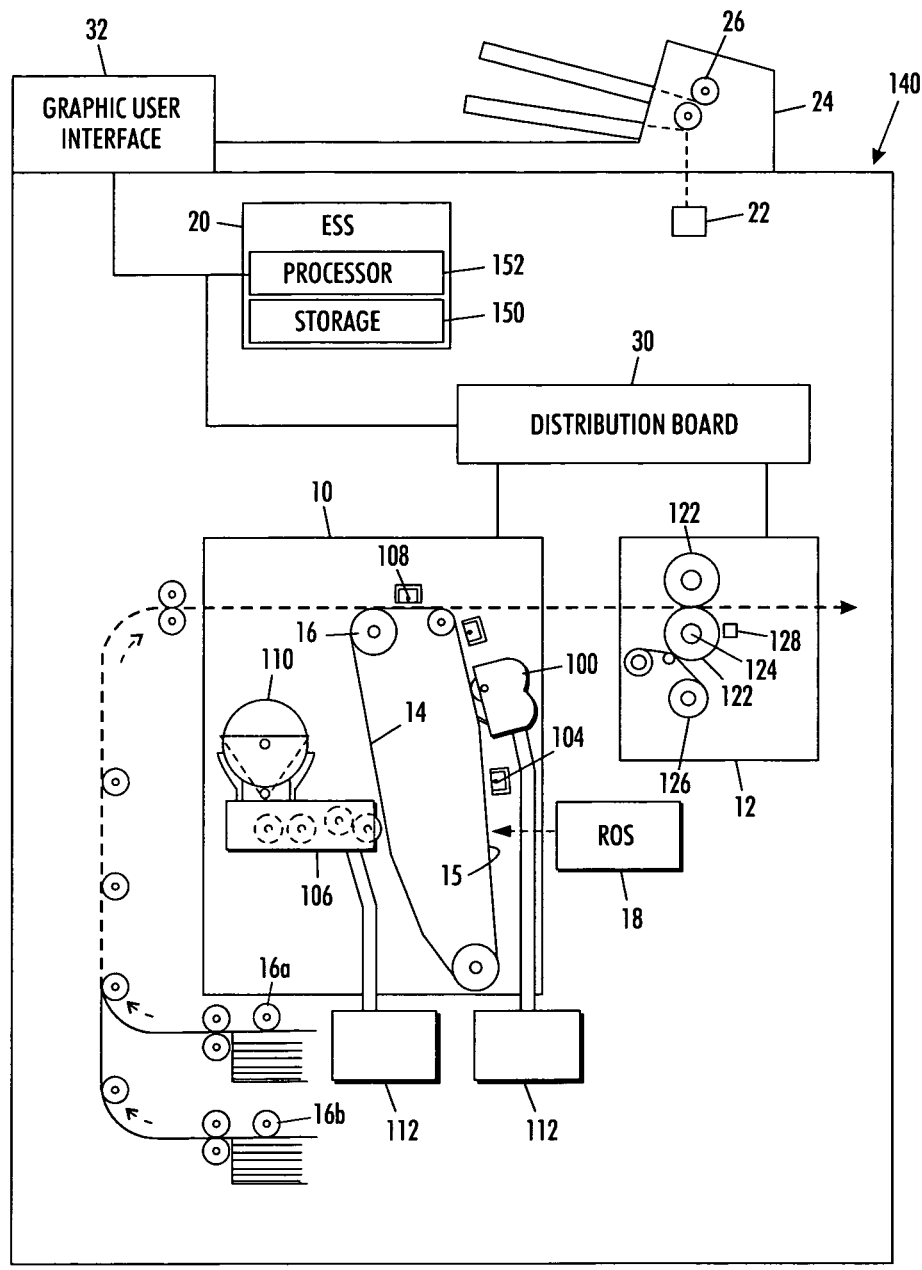
FIG. 2 is a schematic representation of a system embodiment.

In a more specific example, one embodiment is a stand-alone digital copier 140 that is similar to the embodiment shown in FIG. 1, except this copier does not have any external or network connection. The embodiment in FIG. 2 has the integrated scanner 22 and user interface 32. The temporary storage 150, printing engine 10, 12, and processor 152 are all internally within the copier 140. Thus, this embodiment does not need to be connected to a print server, personal computer, etc. through the network connection, but instead can operate independently through direct user input to the user interface 32, needing simply printing supplies (toner, paper, etc.) and a power source.

Whether or not the copier/printer includes an external connection to a print server, computer, etc. one feature of embodiments herein is that the operator or user can invoke the reprint function while at the copier apparatus and before the next print job is scanned. If the copier/printer has the ability to connect to a network device to receive print jobs, this does not diminish the ability of copier/printer to reprint currently active print jobs.

One feature of the embodiments herein is that they save cost and reduce the complexity of the apparatus by eliminating the need to include large complex permanent or semi-permanent memories that have the ability to store multiple maximum document handler-sized print jobs and associated accessories within the copier/printer. Thus, to save costs, decrease complexity, and increase reliability, the embodiments herein can be devoid of such a larger permanent storage capable of storing many previously printed images. Instead, with embodiments herein the reprint function is performed using the limited temporary memory that is only sufficient to perform per-collation operations, and is not large enough to accommodate multiple maximum document handler-sized print jobs. By simplifying the image storage aspect of the copier, the cost and complexity of the copier is decreased.

Figure 3:
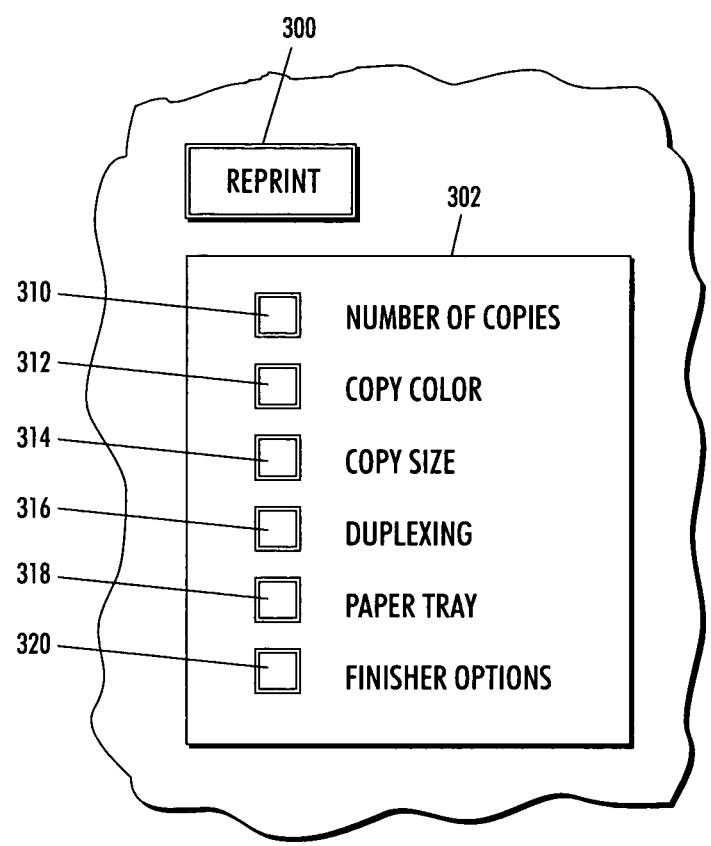
FIG. 3 is a schematic representation of a graphic user interface.

If the user provides an instruction to reprint the image, the user interface 32 is adapted to display a menu of reprint options. Then the image can be reprinted without having to be rescanned. More specifically, FIG. 3 illustrates one example of the reprint button 300 and the menu 302 that appears when the reprint button 300 is depressed. More specifically, the menu 302 includes choices for the number of copies 310, copy color 312, copy magnification or sizing 314, duplexing options 316, paper tray options 318, and/or finisher options 320, etc.

Because the processor 152 is preset to delete the image from the temporary storage 150 upon completion of printing of the image by the printing engine 10, 12, the instruction to reprint the image must be received before the image is deleted from memory by the printing engine 10, 12 in order for the processor 152 to direct reprinting of the image through the printing engine 10, 12. Otherwise the image would have to be rescanned because the image would be purged from memory at the end of the printing process.

In the above explanation, an example of printers and copies was described. However, other than printers, embodiments herein may be applied to multifunction devices, facsimile devices, etc. Further, reprinted copies may be outputted as electronic mail to other devices (e.g., cellular phones) connected via a network.

The embodiments herein add a button in the User Interface (UI), that could be labeled "Re-print" or "Re-program". Activation of this button by the operator while the machine is running or even before the scanning of the next print job, but prior to the job being erased from the memory hard drive (HD), tells the machine that the operator wants to do something else with the originals already stored in the memory. This could be for example, making more copies of the originals already stored in the memory; making new copies with different attributes, say for example, "duplexed", or sending the printed pages to the finisher for 3-hole punching or stapling, and so forth. After the machine has been re-programmed and the operator presses the "Start" button, the machine proceeds to make the new copies without requiring the operator to re-load the originals into the document handler 24.

The embodiments herein increase the productivity of a digital copier that uses a document handler and has electronic pre-collation, that is, it contains a limited size hard drive for storing the scanned images. The use of the reprint button enables the operator to obtain more copies of the same originals, if so desired after the job has started, or simply to get different sets of copies with different attributes for the job, such as simplex vs. duplex, finished vs. unfinished sets, etc. but without requiring the operator to reload the originals in the Document Handler. Embodiments herein take advantage of the fact that the originals once scanned are stored in the machine's HD until sometime after the job is finished and the HD is "cleaned" to make room for the next job. The embodiments herein use the same stored information but change the attributes of the new job as indicated by the operator. This makes a digital copier considerably more productive due to the fact that the operator does not have to wait for the machine to finish the first copy job in order to program the machine for the next copy job, all because this does not involve re-loading the documents in the Document Handler. Such increase in productivity also improves customer satisfaction.

In one example, a large job, for example, 20 sets of a 40-page document are being processed on a digital copier having a document handler and electronic pre-collation. After all the originals have been fed through the document handler, scanned on the platen glass, and the machine starts printing the job, the operator may decide to make 5 more sets of copies of the same originals, with the same or different attributes as the original job. Conventionally the operator would be forced to wait for that job to finish, then at the end of the job, the operator would conventionally have to re-program the machine and re-load the 40 originals into the document handler to make the additional 5 sets required, even though, for some time after the job is finished, the originals are still stored in the machine's hard drive (HD). This requirement of having to re-feed and re-scan the originals in a new job, even though they may still be stored in the machine's HD, represents a major productivity loss, especially when processing large jobs. Therefore, embodiments herein provide a feature for an electronic reprographics device where a scanned document that has not yet been purged from system memory after a job has completed can be reprogrammed as a new job without needing to be rescanned.

It will be appreciated that the above-disclosed and other features and functions, or alternatives thereof, may be desirably combined into many other different systems or applications. Also various presently unforeseen or unanticipated alternatives, modifications, variations or improvements therein may be subsequently made by those skilled in the art which are also intended to be encompassed by the following claims.

What is claimed is:

1. An apparatus comprising:
a scanner adapted to acquire at least one image to be copied;
temporary memory operatively connected to said scanner, wherein said temporary memory is adapted to temporarily store said image only until a subsequent print job is scanned;
at least one printing engine operatively connected to said temporary memory, wherein said printing engine is adapted to print said image on a medium;
a processor operatively connected to said scanner, said temporary memory, and said printing engine; and
a user interface operatively connected to said processor,
wherein said processor is adapted to store said image within said temporary memory only until said subsequent print job is scanned.

2. The apparatus according to claim 1, wherein an instruction to reprint said image must be received before said subsequent print job is scanned in order for said processor to direct reprinting of said image through said printing engine.

3. The apparatus according to claim 1, wherein said user interface includes a reprint button.

4. The apparatus according to claim 1, wherein said user interface includes a reprint menu.

5. The apparatus according to claim 1, wherein said apparatus comprises a stand-alone copier.

6. The apparatus according to claim 5, wherein said scanner, said temporary memory, said printing engine, said processor, and said user interface are integrated into said stand-alone copier.

7. The apparatus according to claim 1, wherein said apparatus is devoid of permanent storage capable of storing mulitiple previously printed images.

8. A stand-alone digital copier apparatus comprising:
a scanner adapted to acquire at least one image to be copied;
temporary memory within said apparatus and being operatively connected to said scanner, wherein said temporary memory is adapted to temporarily store said image only until a subsequent print job is scanned;
at least one printing engine within said apparatus and being operatively connected to said temporary memory, wherein said printing engine is adapted to print said image on a medium;
a processor within said apparatus and being operatively connected to said scanner, said temporary memory, and said printing engine; and
a user interface on an exterior of said apparatus and being operatively connected to said processor,
wherein said processor is adapted to store said image within said temporary memory only until said subsequent print job is scanned.

9. The apparatus according to claim 8, wherein an instruction to reprint said image must be received before said until a subsequent print job is scanned in order for said processor to direct reprinting of said image through said printing engine.

10. The apparatus according to claim 8, wherein said user interface includes a reprint button.

11. The apparatus according to claim 8, wherein said user interface includes a reprint menu.

12. The apparatus according to claim 8, wherein said scanner, said temporary memory, said printing engine, said processor, and said user interface are integrated into said stand-alone copier.

13. The apparatus according to claim 8, wherein said apparatus is devoid of permanent storage capable of storing multiple previously printed images.

14. An apparatus comprising:
a scanner adapted to acquire at least one image to be copied;
temporary memory operatively connected to said scanner, wherein said temporary memory is adapted to temporarily store said image only until a subsequent print job is scanned;
at least one printing engine operatively connected to said temporary memory, wherein said printing engine is adapted to print said image on a medium;
a processor operatively connected to said scanner, said temporary memory, and said printing engine; and
a user interface operatively connected to said processor,
wherein said processor is adapted to store said image within said temporary storage memory only until said subsequent print job is scanned, and
wherein upon receipt of an instruction to reprint said image, said user interface is adapted to display a menu of reprint options for said image, until said subsequent print job is scanned.

15. The apparatus according to claim 14, wherein said instruction to reprint said image must be received before said subsequent print job is scanned in order for said processor to direct reprinting of said image through said printing engine.

16. The apparatus according to claim 14, wherein said user interface includes a reprint button that activates said reprint menu.

17. The apparatus according to claim 14, wherein said to reprint options include at least one, number of copies, copy color, copy magnification, duplexing options, paper tray options, and finisher options.

18. The apparatus according to claim 14, wherein said apparatus comprises a stand-alone copier.

19. The apparatus according to claim 18, wherein said scanner, said temporary memory, said printing engine, said processor, and said user interface are integrated into said stand-alone copier.

20. The apparatus according to claim 14, wherein said apparatus is devoid of permanent storage capable of storing multiple previously printed images.

* * * * *